United States Patent
Nakao (10) Patent No.: US 10,637,297 B2
(45) Date of Patent: Apr. 28, 2020

(54) NON-CONTACT POWER FEEDING SYSTEM

(71) Applicant: OMRON Corporation, Kyoto-shi, Kyoto (JP)

(72) Inventor: Goro Nakao, Inazawa (JP)

(73) Assignee: OMRON Corporation, Kyoto-shi (JP)

( * ) Notice: Subject to any disclaimer, the term of this patent is extended or adjusted under 35 U.S.C. 154(b) by 76 days.

(21) Appl. No.: 15/893,839

(22) Filed: Feb. 12, 2018

(65) Prior Publication Data

US 2018/0183270 A1    Jun. 28, 2018

Related U.S. Application Data

(63) Continuation of application No. PCT/JP2016/081014, filed on Oct. 19, 2016.

(30) Foreign Application Priority Data

Nov. 30, 2015    (JP) .................................. 2015-233463

(51) Int. Cl.
*H02J 7/00* (2006.01)
*H02J 50/12* (2016.01)
(Continued)

(52) U.S. Cl.
CPC ............ *H02J 50/12* (2016.02); *H01M 10/44* (2013.01); *H01M 10/46* (2013.01); *H02J 7/00* (2013.01);
(Continued)

(58) Field of Classification Search
CPC ........ H02J 7/025; H01F 38/14; Y02T 90/122; B60L 11/182; Y02E 60/12
(Continued)

(56) References Cited

U.S. PATENT DOCUMENTS

| | | | |
|---|---|---|---|
| 2010/0270867 A1 | 10/2010 | Abe | |
| 2010/0277120 A1* | 11/2010 | Cook | H01Q 19/005 320/108 |

(Continued)

FOREIGN PATENT DOCUMENTS

| | | |
|---|---|---|
| JP | H10-215530 A | 8/1998 |
| JP | 2001-112191 A | 4/2001 |

(Continued)

OTHER PUBLICATIONS

English translation of the International Search Report of PCT/JP2016/081014 dated Jan. 10, 201.

(Continued)

*Primary Examiner* — Arun C Williams
(74) *Attorney, Agent, or Firm* — Metrolex IP Law Group, PLLC (57) ABSTRACT

A non-contact power feeding system has a power source device and an electronic device configured to operate using power transmitted in a non-contact manner from the power source device. The power source device has a battery, a power reception circuit configured to receive power transmitted in a non-contact manner and to charge the battery with the power, and a power transmission circuit configured to transmit power to the electronic device in a non-contact manner, utilizing power stored in the battery. Furthermore, the power source device may further have a switch connected between the battery and the power transmission circuit, and the power transmission circuit may start power transmission when the switch turns on, whereas the electronic device may further have a starting mechanism provided in a position opposing the switch, when the power source device is attached to a predetermined position, and configured to turn on the switch.

4 Claims, 4 Drawing Sheets

(51) Int. Cl.
*H02J 50/80* (2016.01)
*H04B 5/00* (2006.01)
*H04N 5/232* (2006.01)
*H01M 10/44* (2006.01)
*H01M 10/46* (2006.01)
*H02J 7/02* (2016.01)

(52) U.S. Cl.
CPC .............. *H02J 7/025* (2013.01); *H02J 50/80* (2016.02); *H04B 5/0037* (2013.01); *H04N 5/232* (2013.01); *H04N 5/23241* (2013.01); *H02J 2007/0001* (2013.01); *H02J 2007/0096* (2013.01)

(58) Field of Classification Search
USPC .......................................................... 320/108
See application file for complete search history.

(56) References Cited

U.S. PATENT DOCUMENTS

| | | | | |
|---|---|---|---|---|
| 2011/0115430 | A1* | 5/2011 | Saunamaki | H02J 5/005 320/108 |
| 2011/0187320 | A1* | 8/2011 | Murayama | H02J 7/00 320/108 |
| 2014/0354220 | A1* | 12/2014 | Liu | H02J 50/10 320/108 |
| 2014/0361734 | A1 | 12/2014 | Yamazaki et al. | |
| 2015/0130407 | A1* | 5/2015 | Ni | H01F 38/14 320/108 |
| 2016/0141899 | A1* | 5/2016 | Oo | H02J 7/0044 320/108 |
| 2016/0141908 | A1* | 5/2016 | Jakl | H02J 7/0004 320/108 |
| 2017/0060245 | A1 | 3/2017 | Kukimoto et al. | |

FOREIGN PATENT DOCUMENTS

| | | |
|---|---|---|
| JP | 2009-501510 A | 1/2009 |
| JP | 2010-259172 A | 11/2010 |
| JP | 2011-205830 A | 10/2011 |
| JP | 2014-39437 A | 2/2014 |
| JP | 2014-203940 A | 10/2014 |
| JP | 2017-049698 A | 3/2017 |
| WO | 2012/036024 A1 | 3/2012 |

OTHER PUBLICATIONS

English translation of the Written Opinion of PCT/JP2016/081014 dated Jan. 10, 2017.
The Japanese Office Action (JPOA) dated Nov. 19, 2019 in a counterpart Japanese patent application.
The Japanese Office Action (JPOA) dated Aug. 20, 2019 in a counterpart Japanese patent application.

* cited by examiner

NON-CONTACT POWER FEEDING SYSTEM

CROSS REFERENCE TO RELATED APPLICATIONS

This application is a continuation application of International Application No. PCT/JP2016/081014, filed on Oct. 19, 2016, which claims priority based on the Article 8 of Patent Cooperation Treaty from prior Japanese Patent Application No. 2015-233463, filed on Nov. 30, 2015, the entire contents of which are incorporated herein by reference.

TECHNICAL FIELD

The disclosure relates to a non-contact power feeding system capable of transmitting power in a non-contact manner between two devices.

RELATED ART

Heretofore, so-called non-contact power feeding (also called wireless power feeding) technologies for transmitting power through space without the intermediary of metal contacts or the like have been studied.

As one non-contact power feeding technology, a magnetic field resonance (also called magnetic field resonant coupling or magnetic resonance) method is known (see Patent Document 1). With the magnetic field resonance method, resonant circuits that include a coil are respectively provided on a power transmission side and a power reception side, and a coupled magnetic field state in which energy transfer by magnetic field resonance is possible between the coil on the power transmission side and the coil on the power reception side is produced, by tuning the resonant frequencies of these resonant circuits. Power is thereby transmitted through space from the coil on the power transmission side to the coil on the power reception side. With non-contact power feeding by the magnetic field resonance method, it is possible to attain an energy transfer efficiency of around several tens of percent, and it is possible to comparatively increase the distance between the coil on the power transmission side and the coil on the power reception side. For example, in the case where each coil has a size of around several tens of centimeters, the distance between the coil on the power transmission side and the coil on the power reception side can be set from several tens of centimeters to one meter or more.

RELATED ART DOCUMENTS

Patent Documents

Patent Document 1: JP 2009-501510T

SUMMARY OF THE INVENTION

Problems to be Solved by the Invention

On the other hand, devices that require high waterproofness, such as underwater cameras, are known. With such devices, failure will result from a battery and an electric contact that is provided on the main body of the device coming in contact with water, and thus the device together with the battery are housed in an airtight container, so as to ensure that the battery and the electric contact do not come in contact with water. However, since the storage capacity of the battery itself is limited, it is desired that batteries are replaceable. Thus, the airtight container needs to be provided with an opening/closing mechanism that enables the battery to be inserted and removed, this being a factor that reduces waterproofness.

In view of this, one or more embodiments may provide a non-contact power feeding system that does not readily fail even when coming in contact with water.

Means for Solving the Problems

As one mode, a non-contact power feeding system including a power source device and an electronic device configured to operate using power transmitted in a non-contact manner from the power source device is provided. In this non-contact power feeding system, the power source device includes a battery, a power reception circuit configured to receive power transmitted in a non-contact manner and to charge the battery with the power, and a power transmission circuit configured to transmit power to the electronic device in a non-contact manner, utilizing power stored in the battery.

In this non-contact power feeding system, it may be preferable that the power source device further includes a switch connected between the battery and the power transmission circuit, and the power transmission circuit starts power transmission when the switch turns on. In this case, preferably the electronic device further includes a starting mechanism provided in a position opposing the switch, when the power source device is attached to a predetermined position of the electronic device, and configured to turn on the switch.

Also, in this non-contact power feeding system, it may be preferable the electronic device further includes a transmitting circuit configured to transmit a wireless signal at a predetermined period, while power is being transmitted from the power source device, and the power source device further includes a receiving circuit configured to receive the wireless signal. In this case, it may be preferable the power transmission circuit of the power source device stops power transmission to the electronic device, in a case where the wireless signal from the transmitting circuit cannot be received for a given time period after starting power supply to the electronic device.

Furthermore, in this case, it may be preferable the wireless signal includes identification information of the electronic device, and the power transmission circuit of the power source device determines that the wireless signal from the transmitting circuit has not been received, in a case where the identification information included in the wireless signal received by the receiving circuit does not match identification information stored in advance.

Furthermore, in this non-contact power feeding system, it may be preferable the electronic device further includes a casing configured to removably support the power source device.

Effects of the Invention

A non-contact power feeding system according to one or more embodiments achieves the effect of not readily failing even when coming in contact with water.

EMBODIMENTS OF THE INVENTION

Hereinafter, a non-contact power feeding system according to one or more embodiments will be described, with reference to the drawings. This non-contact power feeding system has a power source device capable of transmission and reception of power using a non-contact power feeding method and an electronic device. When the power source device is attached to a predetermined position of the electronic device, the electronic device receives power using the non-contact power feeding method from the power source device, and operates utilizing the received power. The power source device also receives power using the non-contact power feeding method from a charging device, and charges a built-in battery. The waterproofness of a main body of the electronic device and the power source device is improved, by eliminating exposed electric contacts on the main body of the electronic device and the power source device.

In one or more embodiments, it is assumed that the non-contact power feeding system is utilized in an underwater camera. However, this non-contact power feeding system is not limited to an underwater camera, and may be utilized in various devices with respect to which waterproofness of the main body of the electronic device is required.

Figure 1:
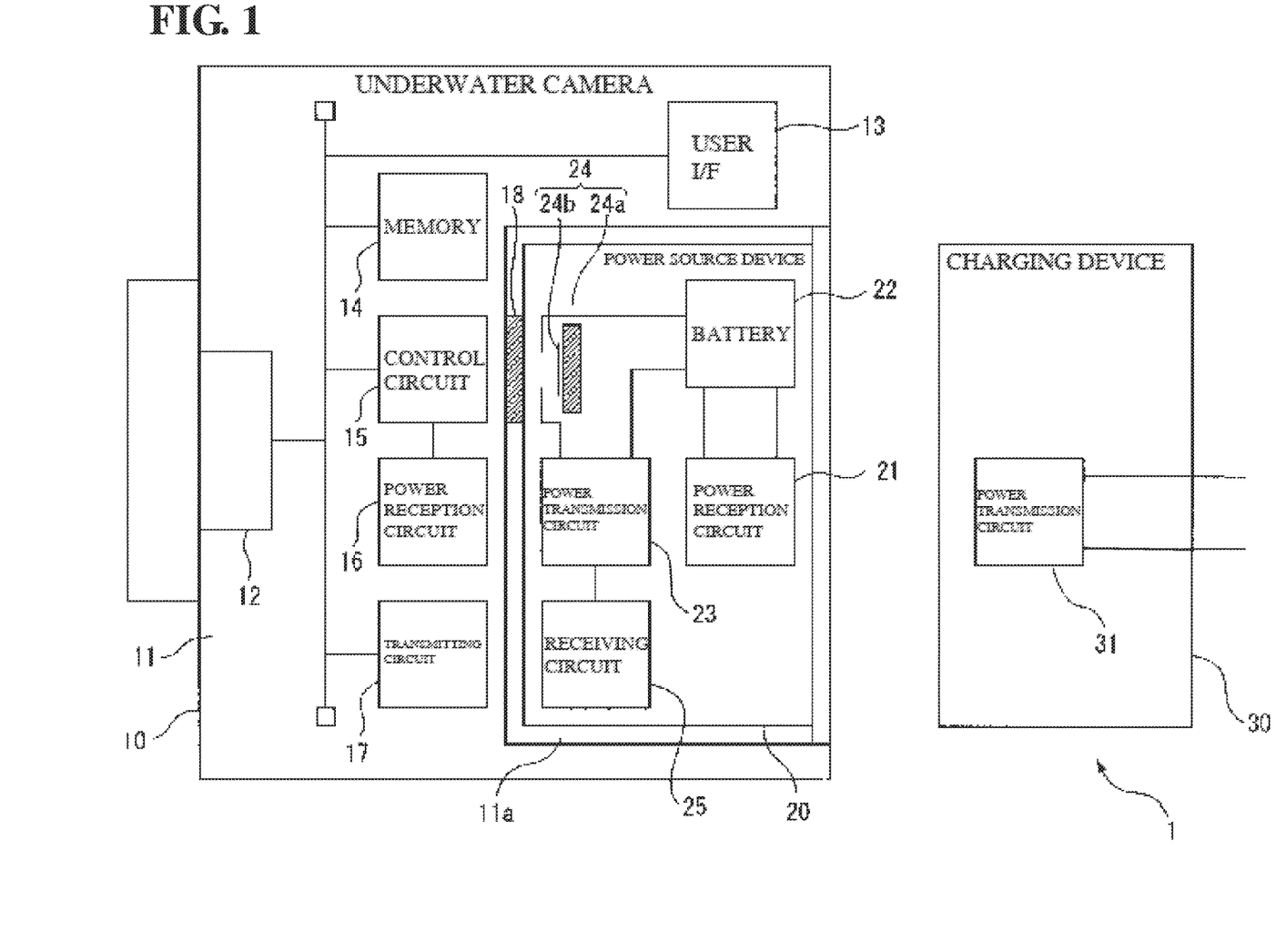
FIG. 1 is a schematic configuration diagram illustrating a non-contact power feeding system according to one or more embodiments.

FIG. 1 is a schematic configuration diagram of the non-contact power feeding system according to one or more embodiments. As shown in FIG. 1, a non-contact power feeding system 1 has an underwater camera 10 which is an example of the electronic device, a power source device 20, and a charging device 30.

When the power source device 20 is housed within a predetermined power source space within the underwater camera 10, the power source device 20 starts power transmission to the underwater camera 10, using the non-contact power feeding method. The underwater camera 10 receives power from the power source device 20, and operates utilizing the received power. Also, the power source device 20, when removed from the underwater camera 10 and placed in a position where power can be received from the charging device 30, receives power using the non-contact power feeding method from the charging device 30, and charges the built-in battery with the received power.

Hereinafter, the devices provided in the non-contact power feeding system 1 will be described. Initially, the underwater camera 10 will be described.

The underwater camera 10 has a casing 11, an imaging unit 12, a user interface 13, a memory 14, a control circuit 15, a power reception circuit 16, a transmitting circuit 17 and a magnet 18. Furthermore, the underwater camera 10 may have a communication interface (not shown) for outputting images to other devices. These units provided in the underwater camera 10 are housed within the sealable casing 11 of the underwater camera 10. The imaging unit 12, the user interface 13, the memory 14, the control circuit 15 and the transmitting circuit 17 operate on receiving power supply from the power reception circuit 16.

The casing 11 houses the units of the underwater camera 10. Also, the casing 11 removably supports the power source device 20. Thus, the casing 11 has a power source space 11a that houses the power source device 20, and an openable/closable lid (not shown) for sealing the whole power source device 20 in a state where the power source device 20 housed. Furthermore, in the power source space 11a, a latch for fixing the power source device 20 or a groove that engages with a protrusion formed on the outer periphery of the power source device 20 may be formed. Also, the power source space 11a is enclosed with an outer wall made of resin, and the power source space 11a, the memory 14, the control circuit 15 and the like are isolated by the outer wall such that the underwater camera 10 does not fail, even if water gets into the power source space 11a.

The imaging unit 12 has, for example, an image sensor that is constituted by an array of solid-state image sensing devices such as a C-MOS image sensor, an imaging optical system that forms an image of an object on the image sensor, and an actuator for adjusting the focal position using the imaging optical system. The imaging unit 12 generates an image taken of an object, according to an image signal from the control circuit 15, and outputs the image to the control circuit 15. Also, the imaging unit 12 adjusts the focal position or adjusts the aperture, according to a control signal from the control circuit 15.

The user interface 13 has, for example, one or more operation buttons for operating the underwater camera 10, and an operation dial and a display. The user interface 13 then generates an operation signal that depends on the operation by the user, and outputs the operation signal to the control circuit 15. Also, the user interface 13 displays a message that depends on the display signal received from the control circuit 15, or an image or the like that is saved in the memory 14.

The memory 14 has a nonvolatile read-only memory circuit and a nonvolatile writable memory circuit, for example. The memory 14 then stores various data that is used by the control circuit 15. Furthermore, the memory 14 stores images generated by the imaging unit 12.

The control circuit 15 has one or a plurality of processors and peripheral circuitry thereof, for example. The control circuit 15 controls the units of the underwater camera 10. For example, the control circuit 15 saves images received from the imaging unit 12 to the memory 14. Also, the control circuit 15 generates an image signal or the like, according to the operation signal received from the user interface 13, and outputs the image signal to the imaging unit 12.

The power reception circuit 16 receives power transmitted from a power transmission circuit 23 of the power source device 20, converts the received power into direct current (DC) power and supplies the DC current to the units of the underwater camera 10, using the non-contact power feeding method. Note that the non-contact power feeding method that is utilized by the power reception circuit 16 may be a magnetic field resonance method or an electromagnetic induction method. Note that the power reception circuit 16 will be discussed in detail later together with detailed description of the power transmission circuit 23 of the power source device 20.

The transmitting circuit 17 outputs a wireless signal that includes identification information of the underwater camera 10, in accordance with a predetermined near-field communication method, every given period (e.g., every 10 sec or 1 min), while power is being supplied from the power reception circuit 16. Thus, the transmitting circuit 17 may, for example, have an active tag in RFID. Alternatively, the transmitting circuit 17 may have a wireless communication circuit compliant with ISO/IEC 18092, for example.

The magnet 18 is an example of a starting mechanism, and is provided within a switch 24 of the power source device 20, in a position opposing the power source space 11a of the casing 11. When the power source device 20 is housed within the power source space 11a, the magnet 18 turns on the switch 24 and starts power supply by the power source device 20, by attracting or repelling a magnet provided in the switch 24.

Next, the power source device 20 will be described.

As shown in FIG. 1, the power source device 20 has a power reception circuit 21, a battery 22, a power transmission circuit 23, a switch 24 and a receiving circuit 25. The power reception circuit 21, the battery 22, the power transmission circuit 23, the switch 24 and the receiving circuit 25 are housed within a sealed casing made of resin, such that the power source device 20 does not fail, even when the power source device 20 is immersed in water.

The power reception circuit 21 receives power sent from the power transmission circuit 31 of the charging device 30 and converts the received power into DC power, using the non-contact power feeding method. The power reception circuit 21 then charges the battery 22, using the DC power. Note that the non-contact power feeding method that is utilized by the power reception circuit 21 may be a magnetic field resonance method or an electromagnetic induction method.

The battery 22 stores power received from the power reception circuit 21. The battery 22 then supplies power to the power transmission circuit 23 and the receiving circuit 25 via the switch 24 as a DC power source, while the power transmission circuit 23 is operating. Thus, the battery 22 has a rechargeable cell such as a rechargeable lithium-ion cell or a nickel-hydrogen storage cell, for example.

The power transmission circuit 23 utilizes the DC power supplied from the battery 22 and supplies power to the power reception circuit 16 of the underwater camera 10, using the non-contact power feeding method, while the switch 24 is on. As mentioned above, the power transmission circuit 23 may utilize one of a magnetic field resonance method and an electromagnetic induction method, as the non-contact power feeding method. Note that the non-contact power feeding method that is utilized between the power reception circuit 21 and the power transmission circuit 31 of the charging device 30 may be the same as the non-contact power feeding method that is utilized between the power transmission circuit 23 and the power reception circuit 16 of the underwater camera 10. In this case, the power reception circuit 21 and the power reception circuit 16 may have a similar configuration. Also, the power transmission circuit 31 and the power transmission circuit 23 may have a similar configuration. Alternatively, the non-contact power feeding method that is utilized between the power reception circuit 21 and the power transmission circuit 31 may be different from the non-contact power feeding method that is utilized between the power transmission circuit 23 and the power reception circuit 16. For example, the power transmission circuit 31 and the power reception circuit 21 whose relative positional relationship at the time of power transmission is not constant may have a circuit that performs power transmission using the magnetic field resonance method, whereas the power transmission circuit 23 and the power reception circuit 16 whose relative positional relationship at the time of power transmission is envisaged to be constant may have a circuit that performs power transmission using the electromagnetic induction method.

Also, the power transmission circuit 23 determines whether a wireless signal that includes identification information of the underwater camera 10 has been received via the receiving circuit 25, every given period (e.g., 10 sec or 1 min) after starting power supply. For example, the power transmission circuit 23, when identification information that is included in a wireless signal is received from the receiving circuit 25, temporarily saves the identification information. The power transmission circuit 23, when the determination timing arrives every given period, compares that identification information with identification information of the underwater camera 10 that is stored in advance. If the two pieces of identification information match, the power transmission circuit 23 determines that a wireless signal including identification information of the underwater camera 10 has been received. On the other hand, when the two pieces of identification information do not match or identification information cannot be acquired from the receiving circuit 25 before the determination timing, the power transmission circuit 23 determines that reception of a wireless signal including identification information of the underwater camera 10 was unsuccessful. The power transmission circuit 23 then discards the temporarily stored identification information that was received from the receiving circuit 25, after the determination.

The power transmission circuit 23 continues power supply if a wireless signal including identification information of the underwater camera 10 is received. On the other hand, the power transmission circuit 23 stops power supply, in the case where reception of a wireless signal that includes identification information of the underwater camera 10 is continuously unsuccessful a predetermined number of times (e.g., 2 to 3 times), that is, in the case where reception of a wireless signal that includes identification information of the underwater camera 10 is unsuccessful for a period that is equivalent to the predetermined number of times.

After stopping power supply, the power transmission circuit 23 continues to stop power supply until the switch 24 turns on again, after the switch 24 was turned off and power supply from the battery 22 was stopped. The power source device 20 is thereby able to avoid running down the battery 22 due to needlessly continuing power supply, if the switch 24 turns on for some reason, in the case where the power source device 20 is not attached to the underwater camera 10.

The switch 24 enables the power source device 20 to start power supply to the underwater camera 10, when the power source device 20 is housed in the underwater camera 10. Thus, the switch 24 is connected between the battery 22 and the power transmission circuit 23 in a position opposing the magnet 18, in a state where the power source device 20 is housed in the power source space 11a of the underwater camera 10.

In one or more embodiments, the switch 24 has a magnet 24a and a lead 24b that is connectable between an electric contact connected to the battery 22 and an electric contact connected to the power transmission circuit 23. For example, in the state in which the power source device 20 is housed in the power source space 11a of the underwater camera 10, the magnet 24a is provided to be moveable in a direction opposing the magnet 18, with the lead 24b and the two electric contacts interposed therebetween. Also, the magnet 24a is attached, such that the magnetic pole of the surface of the magnet 24a on the side opposing the magnet 18 differs from the magnetic pole of the magnet 18 of the side opposing the magnet 24*a*. Also, the lead 24*b* is fixedly attached to the magnet 24*a*, so as to move together with the magnet 24*a*. Furthermore, a spring for biasing in a direction away from the magnet 18 may be provided between the magnet 24*a* and the wall surface of the casing on the magnet 18 side.

When the power source device 20 is housed in the power source space 11*a* of the underwater camera 10, the magnet 24*a* is pulled toward the magnet 18 side and moves toward the magnet 18 side. As a result, the lead 24*b* pressed by the magnet 24*a* also moves toward the magnet 18 side and connects the two electric contacts, and the switch 24 turns on. Power will then be supplied to the power transmission circuit 23 from the battery 22. On the other hand, when the power source device 20 is taken out from the underwater camera 10, the magnet 24*a* and the lead 24*b* move toward the inner side of the power source device 20 due to the biasing force of the spring. As a result, the lead 24*b* separates from the two electric contacts, and the switch 24 turns off.

Note that the magnet 24*a* and the lead 24*b* may be attached so as to be positioned closer to the magnet 18 than are the two electric contacts, in the state where the power source device 20 is housed in the power source space 11*a* of the underwater camera 10. In this case, the magnet 24*a* need only be attached, such that the magnetic pole of the surface of the magnet 24*a* on the side opposing the magnet 18 will be the same as the magnetic pole of the magnet 18 on the side opposing the magnet 24*a*. Also, a spring biasing the magnet 24*a* and the lead 24*b* toward the edge side need only be attached more inwardly than the magnet 24*a*. In this case, when the power source device 20 is housed in the power source space 11*a* of the underwater camera 10, the magnet 24*a* will be repelled by the magnet 18, and move in a direction away from the magnet 18. As a result, the lead 24*b* pressed by the magnet 24*a* also moves in a direction away from the magnet 18 and connects the two electric contacts, and the switch 24 turns on. On the other hand, when the power source device 20 is taken out from the underwater camera 10, the magnet 24*a* and the lead 24*b* move toward the edge side of the power source device 20 due to the biasing force of the spring. As a result, the lead 24*b* separates from the two electric contacts, and the switch 24 turns off.

Note that the starting mechanism is not limited to the above embodiment. For example, a magnetic body such as iron may be used in place of the magnet 24*a*. Also, in the underwater camera 10, a projection may be formed at a position opposing the switch 24 within the power source space 11*a*, in the state where the power source device 20 is housed in the power source space 11*a* of the underwater camera 10. On the other hand, in the power source device 20, an outer wall located between the switch 24 and the projection, in the state where the power source device 20 is housed in the power source space 11*a* of the underwater camera 10, may be formed with an elastic member such as rubber. The lead 24*b* may then be attached between the elastic member and the two electric contacts. In this case, the lead 24*b* contacts the two electric contacts and the switch 24 turns on, due to the elastic member of the outer wall of the power source device 20 being pressed by the projection provided in the power source space 11*a*, as a result of the power source device 20 being housed in the power source space 11*a* of the underwater camera 10. On the other hand, as a result of the elastic member of an outer wall returning to its original shape when the power source device 20 is taken out from the underwater camera 10, the lead 24*b* separates from the two electric contacts, and the switch 24 turns off.

The receiving circuit 25 is driven by the power transmission circuit 23 and receives the wireless signal from the transmitting circuit 17 of the underwater camera 10, while the power transmission circuit 23 is operating. Thus, the receiving circuit 25 can be configured as a communication circuit compliant with the near-field communication standard with which the transmitting circuit 17 is compliant. The receiving circuit 25 then extracts identification information that is included in the wireless signal, whenever the wireless signal is received, and outputs the identification information to the power transmission circuit 23.

Next, the charging device 30 will be described. As shown in FIG. 1, the charging device 30 has a power transmission circuit 31. The power transmission circuit 31 is, for example, connected to a commercial power source. The power transmission circuit 31 transmits power to the power reception circuit 21 of the power source device 20, using the non-contact power feeding method, utilizing the power that is supplied from the commercial power source, in the case where the power source device 20 is in a position where power can be supplied to the charging device 30. As mentioned above, the power transmission circuit 31 may utilize one of a magnetic field resonance method and an electromagnetic induction method as the non-contact power feeding method.

Note that the charging device 30 may have an operation button or the like for a user to select to perform power transmission or to stop power transmission.

Figure 2:
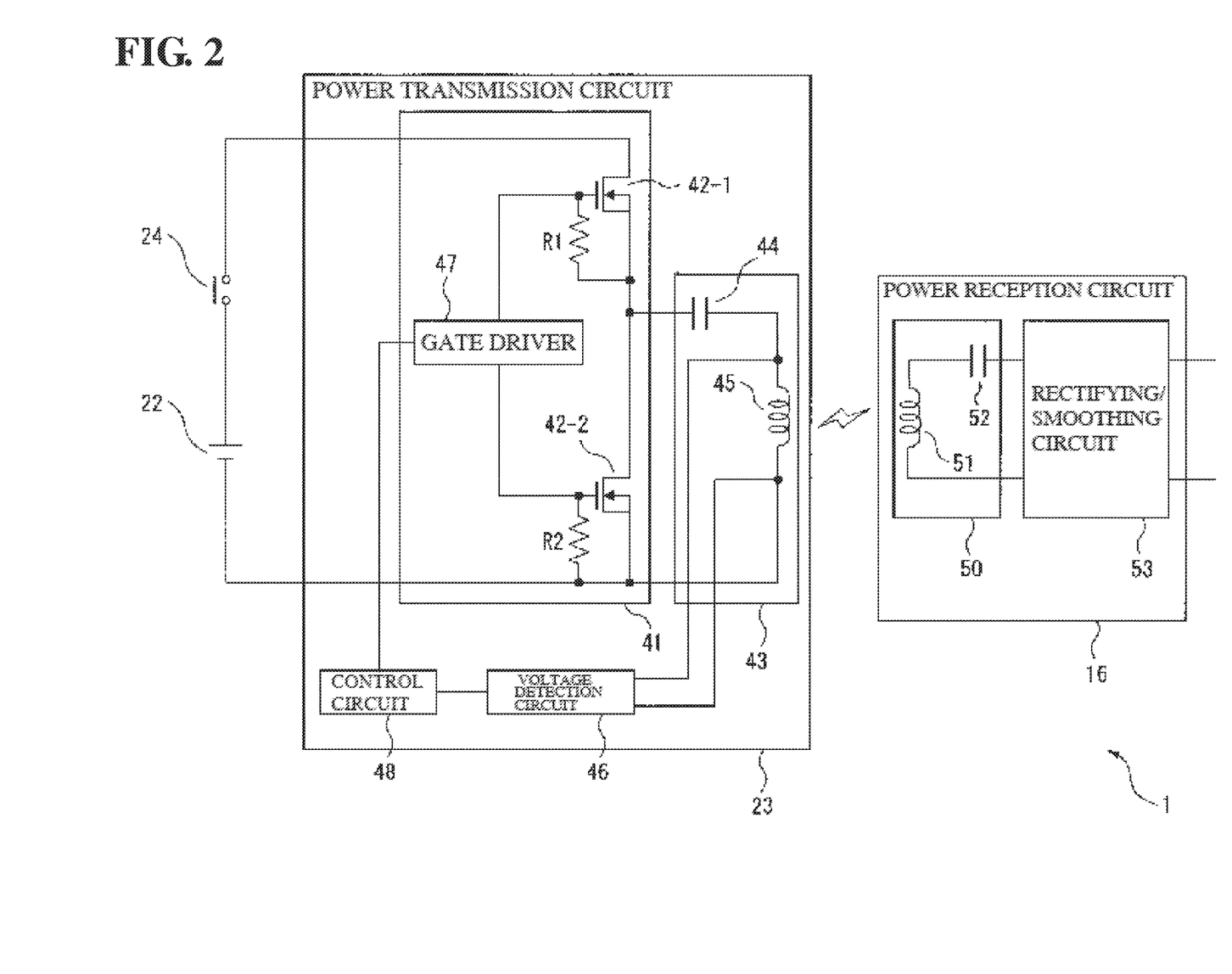
FIG. 2 is a circuit configuration diagram illustrating an example of a power transmission circuit that is provided in a power source device and a power reception circuit that is provided in an underwater camera.

Hereinafter, an example of the circuit configurations of the power reception circuit 16 of the underwater camera 10 and the power transmission circuit 23 of the power source device 20 and the non-contact power feeding operation performed thereby will be described.

FIG. 2 is a diagram showing an example of the circuit configurations of the power reception circuit 16 of the underwater camera 10 and the power transmission circuit 23 of the power source device 20. As shown in FIG. 2, the power transmission circuit 23 has a power supply circuit 41, a resonant circuit 43 having a capacitor 44 and a transmitting coil 45, a voltage detection circuit 46, a gate driver 47, and a control circuit 48. On the other hand, the power reception circuit 16 has a resonant circuit 50 having a receiving coil 51 and a capacitor 52 and a rectifying/smoothing circuit 53.

First, the power transmission circuit 23 will be described.

The power supply circuit 41 supplies alternating current (AC) power having an adjustable operating frequency to the resonant circuit 43. For that purpose, the power supply circuit 41 has two switching elements 42-1 and 42-2.

The two switching elements 42-1 and 42-2 are connected in series between a positive electrode side terminal and a negative electrode side terminal of the battery 22, via the switch 24. Also, in one or more embodiments, the switching element 42-1 is connected, via the switch 24, to the positive electrode side of the battery 22, whereas the switching element 42-2 is connected to the negative electrode side of the battery 22. Note that the switch 24 may be connected between the switching element 42-2 and the negative electrode side terminal of the battery 22. The switching elements 42-1 and 42-2 can, for example, be configured as re-channel MOSFETs. The drain terminal of the switching element 42-1 is connected to the positive electrode side terminal of the battery 22, and the source terminal of the switching element 42-1 is connected to the drain terminal of the switching element 42-2. Also, the source terminal of the switching element 42-2 is connected to the negative electrode side terminal of the battery 22. Furthermore, the source terminal of the switching element 42-1 and the drain terminal of the switching element 42-2 are connected to one end of the transmitting coil 45 via the capacitor 44, and the source terminal of the switching element 42-2 is directly connected to the other end of the transmitting coil 45.

Also, the gate terminals of the switching elements 42-1 and 42-2 are connected to the control circuit 48 via the gate driver 47. Furthermore, the gate terminals of the switching elements 42-1 and 42-2 are respectively connected to the source terminal via resistors R1 and R2, in order to ensure that the switching elements will turn on when a voltage for turning on the switching elements is applied. The switching elements 42-1 and 42-2 are switched on and off alternately, by the control signal from the control circuit 48. The DC power supplied from the battery 22 is converted into AC power through charging and discharging by the capacitor 44, and the AC power is supplied to the resonant circuit 43 composed of the capacitor 44 and the transmitting coil 45.

The resonant circuit 43 is an LC resonant circuit that is formed by the capacitor 44 and the transmitting coil 45. The capacitor 44 is connected at one end to the source terminal of the switching element 42-1 and the drain terminal of the switching element 42-2, and is connected at the other end to the transmitting coil 45.

One end of the transmitting coil 45 is connected to the other end of the capacitor 44, and the other end of the transmitting coil 45 is connected to the negative electrode side terminal of the battery 22 and the source terminal of the switching element 42-2. The transmitting coil 45 then produces a magnetic field that depends on the current flowing through the transmitting coil 45 itself, using the AC power supplied from the power supply circuit 41. In the case where the distance between the transmitting coil 45 and the receiving coil 51 is short enough to enable resonance to occur, the transmitting coil 45 resonates with the receiving coil 51, and transmits power to the receiving coil 51 through space.

The voltage detection circuit 46 detects the AC voltage applied between both terminals of the transmitting coil 45, every predetermined period. Note that the predetermined period is, for example, set to be longer than a period corresponding to a smallest value envisaged for the operating frequency of the AC power that is supplied to the transmitting coil 45, such as 50 msec to 1 sec, for example. Also, the voltage detection circuit 46 measures the peak value or the effective value of the AC voltage, for example, as the AC voltage that is detected. The voltage detection circuit 46 then outputs a voltage detection signal representing the AC voltage to the control circuit 48. Thus, the voltage detection circuit 46 can, for example, be configured as any of various voltage detection circuits that are able to detect an AC voltage.

The gate driver 47 receives a control signal for switching on/off of the switching elements 42-1 and 42-2 from the control circuit 48, and changes the voltage that is applied to the gate terminals of the switching elements 42-1 and 42-2 according to the control signal. That is, the gate driver 47, upon receiving a control signal for turning on the switching element 42-1, applies a relatively high voltage to the gate terminal of the switching element 42-1, such that the switching element 42-1 turns on, and the current from the battery 22 flows through the switching element 42-1. On the other hand, the gate driver 47, upon receiving a control signal for turning off the switching element 42-1, applies a relatively low voltage to the gate terminal of the switching element 42-1, such that the switching element 42-1 turns off, and the current from the battery 22 no longer flows through the switching element 42-1. The gate driver 47 also similarly controls the voltage that is applied to the gate terminal of the switching element 42-2.

The control circuit 48 has, for example, nonvolatile and volatile memory circuits, a computational circuit and an interface circuit for connecting to other circuits, and the operating frequency of the power supply circuit 41, that is, the operating frequency of the AC power that the power supply circuit 41 supplies to the resonant circuit 43, is adjusted according to the AC voltage applied to the transmitting coil 45 which is indicated by the voltage detection signal.

Thus, in one or more embodiments, the control circuit 48 controls the switching elements 42-1 and 42-2, such that the switching element 42-1 and the switching element 42-2 turn on alternately, and the time period during which the switching element 42-1 is on and the time period during which the switching element 42-2 is on within one period corresponding to the operating frequency are equal. Note that the control circuit 48 may provide dead time during which both switching elements are off, when switching on/off of the switching element 42-1 and the switching element 42-2, in order to prevent the switching element 42-1 and the switching element 42-2 from turning on at the same time, and the battery 22 from being short-circuited.

In one or more embodiments, the control circuit 48 changes the operating frequency, that is, the on/off switching period of the switching elements 42-1 and 42-2, in a direction in which the AC voltage that is applied to the transmitting coil 45 increases. Furthermore, the control circuit 48 determines, at a given period, whether a wireless signal from the underwater camera 10 has been received, as mentioned above. The control circuit 48 then turns off the switching elements 42-1 and 42-2, in the case where the wireless signal from the underwater camera 10 cannot be received continuously for a predetermined number of times.

Note that control of the switching elements 42-1 and 42-2 by the control circuit 48 will be discussed in detail later.

Next, the power reception circuit 16 will be described.

The resonant circuit 50 is an LC resonant circuit consisting of the receiving coil 51 and the capacitor 52. The receiving coil 51 that is provided in the resonant circuit 50 is connected at one end to the capacitor 52, and is connected at the other end to the rectifying/smoothing circuit 53.

The receiving coil 51 resonates with the transmitting coil 45 and receives power from the transmitting coil 45, due to resonance occurring with the magnetic field produced by the AC current that flows to the transmitting coil 45 of the power transmission circuit 23. The receiving coil 51 then outputs the received power to the rectifying/smoothing circuit 53 via the capacitor 52. Note that the number of turns of the receiving coil 51 and the number of turns of the transmitting coil 45 of the power transmission circuit 23 may be the same or may differ. Also, the inductance of the receiving coil 51 and the electrostatic capacity of the capacitor 52 are preferably set, such that the resonant frequency of the resonant circuit 50 and the resonant frequency of the resonant circuit 43 of the power transmission circuit 23 will be equal.

The capacitor 52 is connected at one end to the receiving coil 51, and is connected at the other end to the rectifying/smoothing circuit 53. The capacitor 52 then outputs power received by the receiving coil 51 to the rectifying/smoothing circuit 53.

The rectifying/smoothing circuit 53 rectifies and smoothes the power received using the receiving coil 51 and the capacitor 52, and converts the received power into DC power. The rectifying/smoothing circuit 53 then outputs the DC power to the units of the underwater camera 10. For that purpose, the rectifying/smoothing circuit 53 has, for example, a full-wave rectifying circuit and a smoothing capacitor. Furthermore, in the case where the underwater camera 10 includes circuits whose operating voltages differ, the rectifying/smoothing circuit 53 may include a DC-DC converter so as to be able to supply power having a DC voltage suitable for each circuit.

Hereinafter, the non-contact power feeding operation between the power transmission circuit 23 and the power reception circuit 16 will be described in detail.

Figure 3:
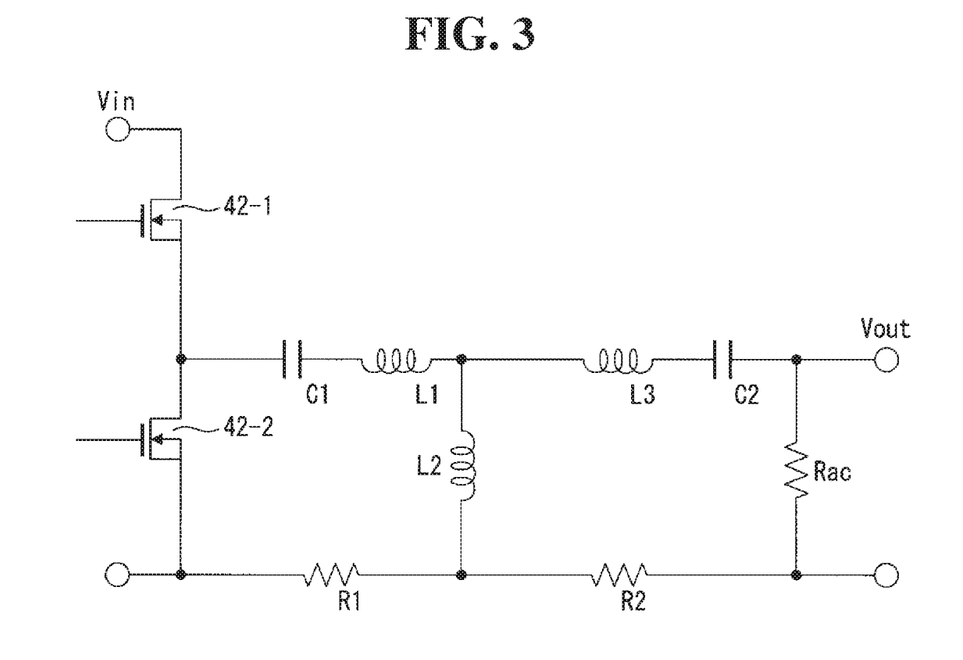
FIG. 3 is an equivalent circuit diagram illustrating a power transmission circuit and a power reception circuit.

FIG. 3 is an equivalent circuit diagram of the power transmission circuit 23 and the power reception circuit 16. Here, $L_1$ and $L_3$ are respectively the leakage inductances on the power transmission side and the power reception side, and $L_2$ is the mutual inductance. $L_1=L_3=(1-k)L_0$ and $L_2=kL_0$, where $L_0$ is the self-inductance of the transmitting coil 45 and the receiving coil 51, and k is the degree of coupling between the transmitting coil 45 and the receiving coil 51. For example, $L_1=L_3=8.205$ μH and $L_2=22.3$ μH when $L_0=30.5$ μH and k=0.731028. Generally, the degree of coupling k increases as the distance between the transmitting coil 45 and the receiving coil 51 narrows. In this case, a transmission matrix A(f), which is represented by F parameter analysis, is represented with the following equation.

Equation 1

$$A(f) := \begin{bmatrix} 1 & \frac{1}{s(f) \cdot C1} \\ 0 & 1 \end{bmatrix} \cdot \begin{bmatrix} 1 & s(f) \cdot L1 + R2 \\ 0 & 1 \end{bmatrix} \cdot \begin{bmatrix} 1 & 0 \\ \frac{1}{s(f) \cdot L2} & 1 \end{bmatrix} \cdot \begin{bmatrix} 1 & s(f) \cdot L3 + R3 \\ 0 & 1 \end{bmatrix} \cdot \begin{bmatrix} 1 & \frac{1}{s(f) \cdot C3} \\ 0 & 1 \end{bmatrix} \cdot \begin{bmatrix} 1 & 0 \\ \frac{1}{Rac} & 1 \end{bmatrix} \quad (1)$$

Here, f is the operating frequency of the power transmission circuit 23, $s(f)=j\omega$ and $\omega=2\pi f$. C1 and C2 are respectively the electrostatic capacities on the power transmission side and the power reception side. R1 and R2 are the impedances on the power transmission side and the power reception side. Rac is the impedance of the load circuit.

Figure 4:
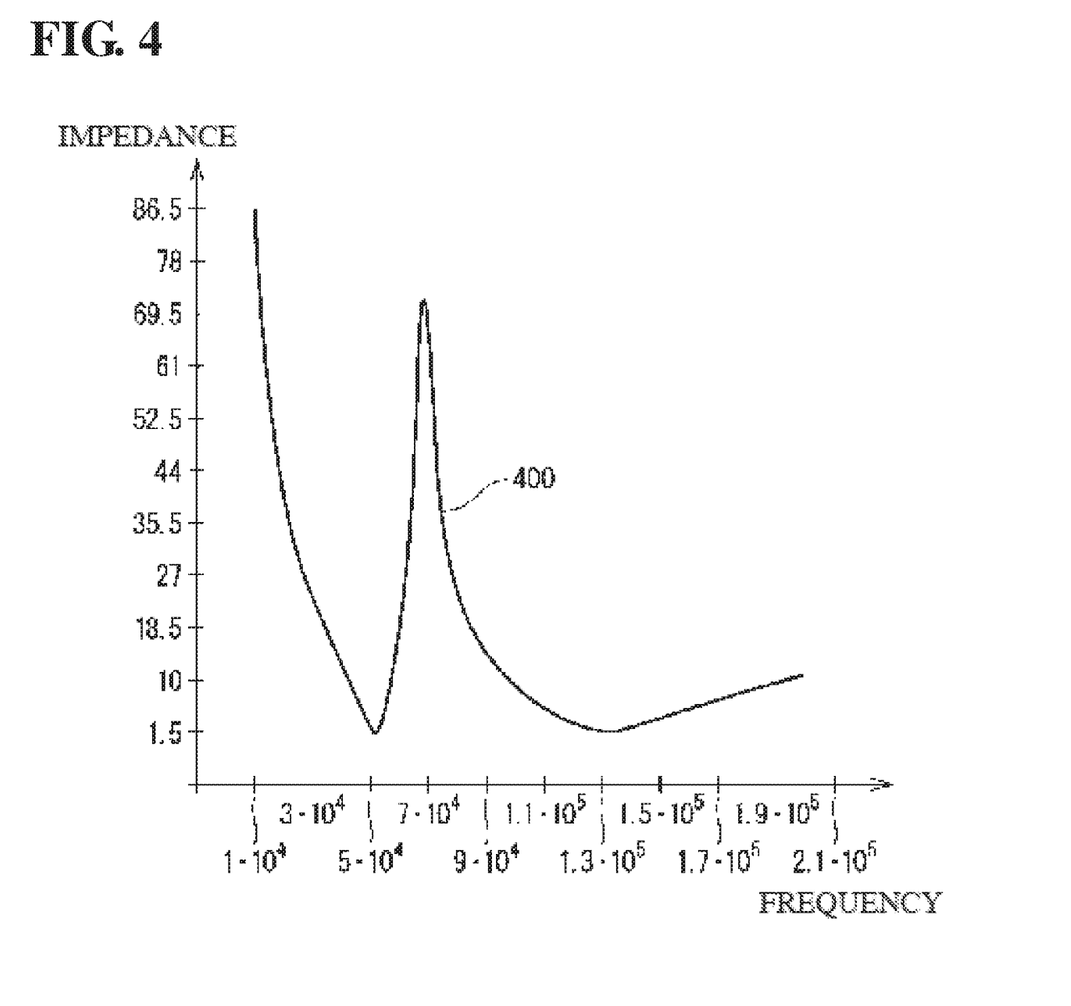
FIG. 4 is a diagram illustrating an example of the frequency characteristics of impedance of an equivalent circuit, such as in FIG. 3.

FIG. 4 is a diagram showing an example of the frequency characteristics of impedance of the equivalent circuit shown in FIG. 3. In FIG. 4, the horizontal axis represents frequency and the vertical axis represents impedance. Note that the impedance of the equivalent circuit is calculated as the absolute value of the ratio of the element on the upper left to the element on the lower left in the transmission matrix A(f) of equation (1), which is represented with two rows and two columns. A graph 400 represents the frequency characteristics of impedance. Note that the graph 400 was calculated based on equation (1), where $L_0=30.5$ μH and k=0.731028, and where C1=C2=180 nF and R1=R2=270 mΩ.

As shown in FIG. 4, in the case where the degree of coupling k is comparatively large, the frequency characteristics of impedance has two local minimum values. That is, the transmitting coil 45 and the receiving coil 51 resonate at two frequencies, and at each resonant frequency, the impedance is at a local minimum, that is, the energy transfer power amount is at a local maximum. Accordingly, as the operating frequency of AC power that is supplied to the resonant circuit 43 of the power transmission circuit 23 approaches one of the resonant frequencies, the impedance between the power transmission side and the power reception side will decrease, enabling the energy transfer power amount that is transmitted from the transmitting coil 45 to the receiving coil 51 to be increased. Thus, the AC voltage between both terminals of the receiving coil 51 on the power reception side also increases, as the operating frequency of AC power that is supplied to the resonant circuit 43 approaches one of the resonant frequencies.

Also, the relationship between the AC voltage on the power reception side and the AC voltage on the power transmission side is represented with the following relational equation.

Equation 2

$$V_2 = \frac{n_2}{n_1} k V_1 \quad (2)$$

Here, V1 is the AC voltage on the power transmission side, that is, the AC voltage that is applied to the transmitting coil 45, V2 is the AC voltage on the power reception side, that is, the AC voltage that is applied to the receiving coil 51. k is the degree of coupling. n1 and n2 are respectively the number of turns of the transmitting coil 45 and the number of turns of the receiving coil 51. As shown in equation (2), a stronger correlation relationship occurs between the voltage on the power reception side and the voltage on the power transmission side, as the degree of coupling increases. Thus, as long as the distance between the transmitting coil 45 and the receiving coil 51 is short and there is a certain degree of coupling, the AC voltage that is applied to the transmitting coil 45 on the power transmission side also increases, as the AC voltage of the receiving coil 51 on the power reception side increases, that is, as the power that can be extracted on the power reception side increases.

In view of this, the control circuit 48 of the power transmission circuit 23 changes the operating frequency of AC power supplied to the resonant circuit 43, that is, the on/off switching period of the switching elements 42-1 and 42-2, every given period, in a direction in which the AC voltage applied to the transmitting coil 45, which is indicated by the voltage detection signal, increases.

For example, the control circuit 48 saves the operating frequency and the value of the AC voltage that is applied to the transmitting coil 45 at a certain point in time to a memory circuit that is provided in the control circuit 48. The control circuit 48 then changes the operating frequency in a direction in which the operating frequency increases or decreases by a predetermined amount (e.g., 10 Hz to 100 Hz). The control circuit 48 then compares the latest value of the AC voltage, which is indicated by the voltage detection signal acquired from the voltage detection circuit 46 after changing the operating frequency, with the value of the previous AC voltage that is stored. In the case where the latest value of the AC voltage is higher than the previous value of the AC voltage, the control circuit 48 changes the operating frequency by a predetermined amount in the same direction as the direction of the previous change. For example, in the case where the operating frequency was increased at the time of the previous operating frequency change, and the latest value of the AC voltage is higher than the previous value of the AC voltage, the control circuit 48 further increases the operating frequency by a predetermined amount. Conversely, in the case where the latest value of the AC voltage is lower than the previous value of the AC voltage, the control circuit 48 changes the operating frequency by a predetermined amount in the opposite direction to the direction of the previous change. For example, in the case where the operating frequency was increased at the time of the previous operating frequency change, and the latest value of the AC voltage is lower than the previous value of the AC voltage, the control circuit 48 decreases the operating frequency by a predetermined amount. Note that the control circuit 48 may change the operating frequency in either direction, in the case where the latest value of the AC voltage is equal to the previous value of the AC voltage. The control circuit 48 is thereby able to approximate the operating frequency to one of the resonant frequencies between the transmitting coil 45 and the receiving coil 51.

Note that, the control circuit 48, in the case where the latest value of the AC voltage is greater than or equal to a predetermined threshold value, may stop adjustment of the operating frequency, and may keep the operating frequency constant after stopping adjustment. The control circuit 48 may then resume adjustment of the operating frequency, in the case where the latest value of the AC voltage falls to less than the predetermined threshold value, after stopping adjustment of the operating frequency.

Also, the control circuit 48 may change the operating frequency to be higher or may change the operating frequency to be lower, at the time of changing the initial operating frequency after starting power feeding.

Also, in the case where the transmitting coil 45 and the receiving coil 51 are separated to a certain extent, the number of resonant frequencies resulting from magnetic resonance between the transmitting coil 45 and the receiving coil 51 will be one, and that resonant frequency will be equal to the resonant frequency of the resonant circuit 43 itself. That one resonant frequency is included between the two resonant frequencies that appear in the case where the distance between the transmitting coil 45 and the receiving coil 51 is short. In view of this, the resonant frequency of the resonant circuit 43 itself may be stored in advance in the memory circuit of the control circuit 48, and the control circuit 48 may set the operating frequency at the time of starting power supply to the resonant frequency of the resonant circuit 43 itself. Alternatively, the control circuit 48 may store the operating frequency at the time when power supply was last ended in the memory circuit, and the stored operating frequency may be used as the operating frequency at the time when power supply is next started. By setting the operating frequency at the time when power supply is started in this way, the control circuit 48 is able to shorten the time needed for the operating frequency to approach one of the resonant frequencies resulting from the magnetic resonance between the transmitting coil 45 and the receiving coil 51.

Note that the lower limit and upper limit of the operating frequency may be set in advance. The control circuit 48 may then adjust the operating frequency between the lower limit and upper limit of the operating frequency. In this case, for example, the lower limit and the upper limit of the operating frequency are respectively set to a lower limit and an upper limit envisaged for the resonant frequency resulting from magnetic resonance between the transmitting coil 45 and the receiving coil 51.

Also, the control circuit 48 need not change the operating frequency, in the case where the latest value of the AC voltage, which is indicated by the voltage detection signal acquired from the voltage detection circuit 46, is greater than or equal to a predetermined threshold value. Furthermore, the control circuit 48 may also decrease the amount of change in the operating frequency, as the absolute value of the difference between the latest value of the AC voltage and the previous value of the AC voltage decreases.

As described above, with this non-contact power feeding system, because the power source device has a power transmission circuit capable of supplying power using a non-contact power feeding method, a power reception circuit capable of receiving power using the non-contact power feeding method, and a battery, electric contacts exposed externally need not be provided on both the power source device and the electronic device that operates using power transmitted from the power source device. Thus, with this non-contact power feeding system, waterproofness can be improved with regard to both the power source device and the electronic device. Also, with this non-contact power feeding system, it is possible to replace only the power source device, in the case where the power source device deteriorates over time or fails. Thus, the electronic device can be used for a longer period than the life of the power source device. Furthermore, with this non-contact power feeding system, because power transmission is performed by a starting mechanism and a switch in the case where the power source device is attached to the electronic device, the battery lifetime of the power source device can be extended. Furthermore, because this non-contact power feeding system determines whether to continue power transmission, through communication between the electronic device and the power source device, the power source device can be prevented from continuing to operate even when the power source device is accidentally attached to another device or the like.

Note that, according to a variation, the transmitting circuit 17 of the underwater camera 10 and the receiving circuit 25 of the power source device 20 may be omitted. In this case, the power source device 20 stops power transmission, only as a result of the power source device 20 being removed from the underwater camera 10 and the switch turning off.

Also, in the state where the power source device 20 is attached to the underwater camera 10, the positional relationship between the power reception circuit 16 of the underwater camera 10 and the power transmission circuit 23 of the power source device 20 is kept constant. In view of this, according to another variation, the voltage detection circuit 46 may be omitted in the power transmission circuit 23 of the power source device 20. The control circuit 48 of the power transmission circuit 23 may then perform on/off control of the switching elements 42-1 and 42-2 alternately at a resonant frequency that depends on the distance between the transmitting coil 45 and the receiving coil 51 that is envisaged in the state where the power source device 20 is attached to the underwater camera 10.

In this way, a person skilled in the art is able to make various changes in accordance with the mode that is carried out, within the scope of the invention.

INDEX TO THE REFERENCE NUMERALS

1 Non-contact power feeding system
 10 Underwater camera (electronic device)
 11 Casing
 12 Imaging unit
 13 User interface
 14 Memory
 15 Control circuit
 16 Power reception circuit
 17 Transmitting circuit
 18 Magnet
 20 Power supply device 21 Power reception circuit
22 Battery
23 Power transmission circuit
24 Switch
25 Receiving circuit
30 Charging device
31 Power transmission circuit
42-1, 42-2 Switching element
43 Resonant circuit
44 Capacitor
45 Transmitting coil
46 Voltage detection circuit
47 Gate driver
48 Control circuit
50 Resonant circuit
51 Receiving coil
52 Capacitor
53 Rectifying/smoothing circuit

The invention claimed is:

1. A non-contact power feeding system comprising:
a power source device; and
an electronic device configured to operate using power transmitted in a non-contact manner from the power source device, wherein
the power source device comprises:
   a battery;
   a power reception circuit configured to receive power transmitted in a non-contact manner and to charge the battery with the power;
   a power transmission circuit configured to transmit power stored in the battery to the electronic device in a non-contact manner; and
   a switch connected between the battery and the power transmission circuit;
the power transmission circuit starts power transmission in response to the switch turning on;
the electronic device further comprises:
   a starting mechanism provided in a position opposing the switch and configured to turn on the switch in response to the power source being attached to a predetermined position of the electronic device; and
   a transmitting circuit configured to transmit a wireless signal at a predetermined period in response to power being transmitted from the power source device;
the power source device further comprises a receiving circuit configured to receive the wireless signal; and
the power transmission circuit of the power source device stops power transmission to the electronic device in response to being unable to receive the wireless signal from the transmitting circuit for a given time period after starting power transmission to the electronic device.

2. The non-contact power feeding system according to claim 1, wherein:
the wireless signal comprises identification information of the electronic device; and
the power transmission circuit of the power source device determines that the wireless signal from the transmitting circuit has not been received in response to the identification information included in the wireless signal received by the receiving circuit not matching identification information stored in advance.

3. The non-contact power feeding system according to claim 1,
wherein the electronic device further comprises a casing configured to removably support the power source device.

4. The non-contact power feeding system according to claim 2,
wherein the electronic device further comprises a casing configured to removably support the power source device.

* * * * *